Patented Oct. 9, 1923.

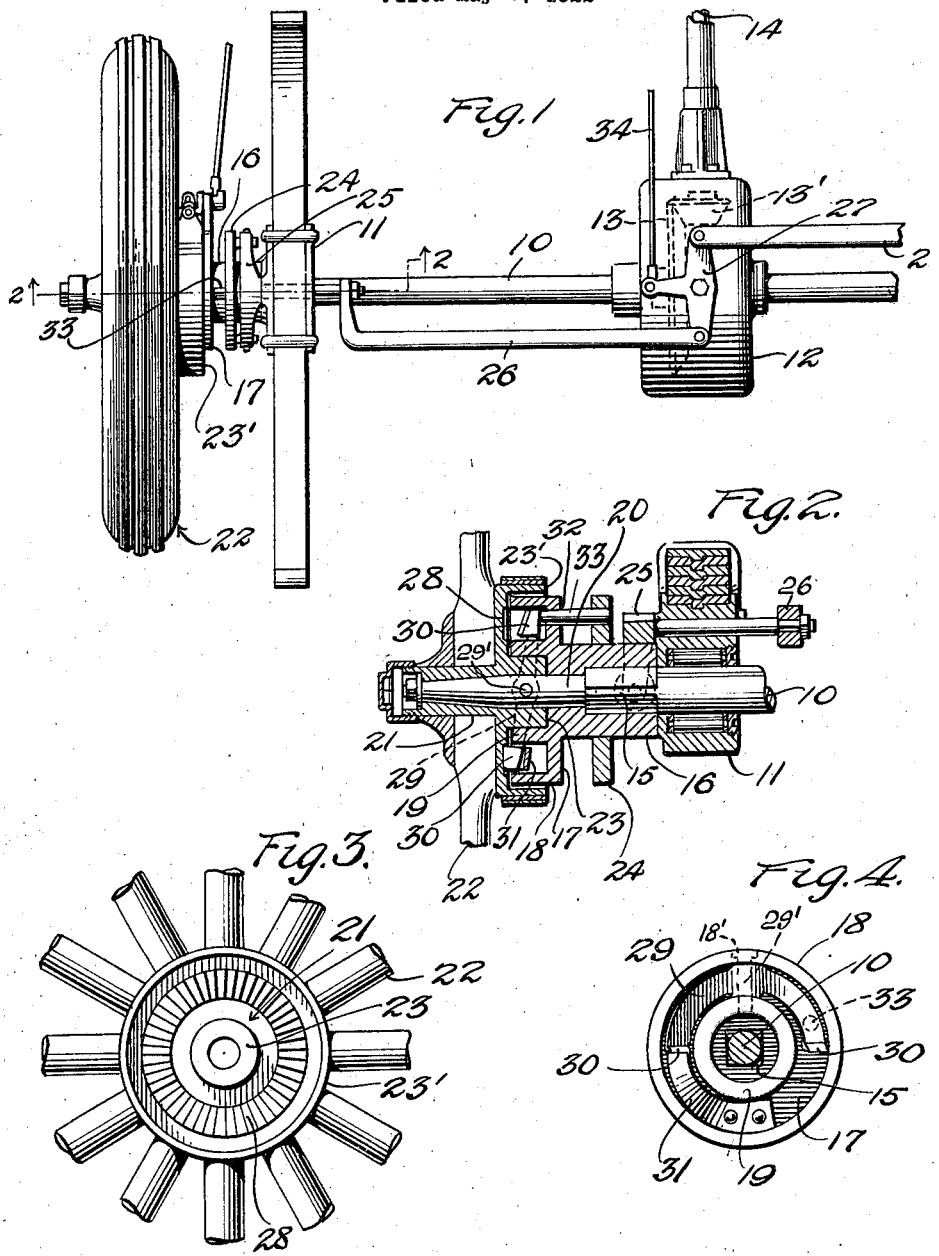

1,470,317

UNITED STATES PATENT OFFICE.

WILLIAM T. BEDDINGFIELD, OF MERIDIAN, MISSISSIPPI.

AUTOMOBILE DRIVE GEAR.

Application filed May 5, 1922. Serial No. 558,568.

*To all whom it may concern:*

Be it known that I, WILLIAM T. BEDDINGFIELD, a citizen of the United States, residing at Meridian, in the county of Lauderdale, State of Mississippi, have invented certain new and useful Improvements in Automobile Drive Gears; and I do hereby declare the following to be a full, clear, and exact description of the invention, such as will enable others skilled in the art to which it appertains, to make and use the same.

This invention relates to new and useful improvements in driving gear and particularly to driving gear for automobiles.

One object of the invention is to provide a driving gear which includes novel and improved means for permitting either one of the traction wheels of an automobile to run idly, as when making a turn, whereby the use of the ordinary complicated differential is obviated.

Another object is to provide novel and improved means for controlling the wheel driving means, whereby the wheels may be driven forwardly or backwardly, at the will of the driver, said controlling means being operable from the driver's seat.

Other objects and advantages will be apparent from the following description when taken in connection with the accompanying drawing.

In the drawing:

Figure 1 is a top plan view of the improved driving gear, applied to an automobile, only one wheel of the automobile being shown.

Figure 2 is an enlarged vertical longitudinal central sectional view through the wheel, on the line 2—2 of Figure 1, the axle remaining in elevation.

Figure 3 is an elevation of the toothed face of the hub of the wheel.

Figure 4 is an elevation of the driving disk carried by the axle, and showing the rocking pawl yoke.

Referring particularly to the accompanying drawing, 10 represents the axle, which is supported in the end bearings 11, and in the central housing 12. On the center of the axle is fixed a bevel gear 13, which meshes with a similar gear 13', on the end of the transmission or propeller shaft 14, which also extends into, and is rotatably supported in the central housing.

Each end of the axle 10 is formed with a squared portion 15, to be received in the squared bore of the hub 16, of the disk 17, and whereby the said disk and hub are adapted to rotate with the axle. The outer face of the disk 17 is formed with a peripheral flange 18, and extending in concentric relation to the flange and surrounding the outer end of the bore of the hub 16, is a smaller flange 19. The portion of the axle, outwardly of the squared portion 15, is circular in cross section, as shown at 20, and rotatably supported thereon is the hub 21, of the wheel 22. The inner face of this hub 21 is formed with a central flange 23 which is enclosed, or embraced by the flange 19, whereby to prevent any tendency toward play of the wheel on the axle. Slidable on the outer face of the hub 16 is a collar 24, the same being arranged to be moved toward the wheel by means of the yoke 25, carried on the adjacent end of the link 26. The other end of this link is pivotally connected with a rocking member 27, mounted on the housing 12. On the face of the hub 21, between the flanges 23 and 23', there are formed the circular series of teeth 28. Disposed within the flange 18 of the disk 17 is a yoke 29, the arms of which embrace the central flange 19, and on the outer end of each of the arms of the yoke there is formed a tooth 30 for engagement with the teeth 28. Disposed in the center of the convex face of the yoke 29 is a stud 29', which is rotatably supported in an opening 18' in the flange 18. Carried by the disk 17 and bearing against one arm of the yoke, to normally and yieldably hold said arm in engagement with the teeth 28, is a spring 31, which may be of any desired type, that shown being a leaf spring. Carried by the slidable collar 24, and slidable through an opening 32, in the disk 17, is a pin 33, which is arranged to engage with the rear of the other arm of the yoke 29, to rock the first arm away from the teeth 28, and the second arm into engagement with the teeth, when said collar is moved toward the wheel. This rocking of the yoke will result in engagement of the tooth of the said arm with the teeth 28, when the drive of the wheel 22 is to be rearwardly. The spring 31 not only serves to urge the arm of the yoke into engagement with the teeth 28, but also serves to push the pin 33 outwardly through the opening 32, and with it the collar 24, by its rocking action on the yoke.

An operating rod 34 is connected with the rocking member 27, and is arranged to extend into a position to be operated by the driver from his seat.

It will be noted that the link 26 is slidably disposed through the end bearing 11, so that the collar and said link will be moved in proper alignment. The yoke 25 straddles the hub 16, between the bearing 11 and the sliding collar 24, so that when the said yoke is moved by the rocking of the member 27, the collar will be moved to rock the yoke 29, by pressure of the pin 33 against the arm of the yoke, the spring 31 serving to restore the parts to normal position, whereby the yoke 29 is rocked to engage the spring engaged arm with the teeth of the wheel hub, for forward driving.

When the yoke 29 is rocked by the movement of the collar 24, the first-named arm of the yoke will ratchet idly on the teeth 28, while the other arm will engage with the teeth to cause a reverse or backward driving of the wheel. Thus the driver has only to rock the member 27 to accomplish the reversing of the drive.

Attention is also called to the fact that, when the automobile makes a turn the inner wheel will drive while the outer wheel will travel idly on the axle, the yoke 29 ratcheting idly over the teeth 28, by reason of the fact that the outer wheel has a larger arc of movement than the inner wheel.

By the construction herein described the use of the complicated differential, and the divided axle, are obviated, the drive being made to a single solid axle.

Furthermore, the telescoping arrangement of the flanges 19 and 23 serves to hold the wheel from any tendency to rock or wobble on the axle.

What is claimed is:

1. A drive gear including a driven shaft, a rotor loosely mounted on the shaft and having a circular series of teeth, a flanged disk having a hub fixed on the shaft for rotation therewith, a yoke having a stud rockingly supported in the flange of the disk and having a tooth on each arm, a spring on the disk normally urging one arm of the yoke into engagement with the teeth, a collar slidable on the hub of the disk and having a projection disposed through the disk and engaged with the other arm of the yoke, and means for moving the collar to rock the yoke to engage the last-named arm with the teeth and disengage the first-named arm therefrom.

2. A drive gear including a shaft, a hub fixed on the shaft and having concentric flanges on one end, a wheel hub rotatable on one end of the shaft and having a flange encircling the outer flange of the first hub, the face of the wheel hub having a circular series of teeth, a curved yoke embracing the inner flange of the first hub and having terminal teeth for alternate engagement with the said teeth, a spring between one arm of the yoke and the first hub, and means for engagement with the other arm to rock the yoke to disengage the spring engaged arm from the teeth and to engage the other arm therewith.

3. A drive gear including a shaft, a hub fixed on the shaft and having a disk on one end formed with concentric flanges, said disk having an opening therein between the flanges, a wheel hub rotatable on the end of the shaft and having a flange embracing the outer of the concentric flanges, the face of the wheel hub, within the flange thereof, being formed with a circular series of teeth, a yoke partially encircling the inner flange of the first hub and having terminal tooth engaging portions, means for normally urging one arm of the yoke into engagement with the teeth of the wheel hub, and a collar slidable on the first hub provided with a pin slidable through the opening of the disk for moving the other arm of the yoke to engage the same with said teeth and disengage the first-named arm.

In testimony whereof, I affix my signature, in the presence of two witnesses.

WILLIAM T. BEDDINGFIELD.

Witnesses:
ALEXANDER WOLF,
HARRY M. TEST.